(12) United States Patent  (10) Patent No.: US 6,829,899 B2
Benham, Jr. et al.  (45) Date of Patent: Dec. 14, 2004

(54) JET FUEL AND AIR SYSTEM FOR STARTING AUXILIARY POWER UNIT

(75) Inventors: Durward S. Benham, Jr., Phoenix, AZ (US); Michael S. Koerner, Rancho Palos Verdes, CA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/057,229

(22) Filed: Jan. 25, 2002

(65) Prior Publication Data

US 2003/0140635 A1 Jul. 31, 2003

(51) Int. Cl.$^7$ ............................................. F02C 7/268
(52) U.S. Cl. ............................. 60/787; 60/786; 60/778
(58) Field of Search ........................... 60/786, 787, 778

(56) References Cited

U.S. PATENT DOCUMENTS

| | | | |
|---|---|---|---|
| 2,723,531 A | | 11/1955 | Wosika et al. |
| 3,782,223 A | | 1/1974 | Watson |
| 3,965,673 A | | 6/1976 | Friedrich |
| 4,033,115 A | * | 7/1977 | Baits ........................ 60/39.091 |
| 4,068,468 A | * | 1/1978 | Wood et al. .................. 60/787 |
| 4,077,202 A | | 3/1978 | Schutze |
| 4,713,982 A | | 12/1987 | Fluegel et al. |
| 4,759,178 A | | 7/1988 | Joy |
| 4,777,793 A | * | 10/1988 | Weigand et al. .............. 60/787 |
| 4,815,277 A | | 3/1989 | Vershure, Jr. et al. |
| 4,864,812 A | | 9/1989 | Rodgers et al. |
| 5,031,398 A | * | 7/1991 | Lampe et al. ............ 60/39.281 |
| 5,060,469 A | * | 10/1991 | Klaass et al. ................. 60/773 |
| 5,085,071 A | | 2/1992 | Mizushina et al. |
| 5,097,659 A | | 3/1992 | Lampe et al. |
| 5,179,831 A | * | 1/1993 | Lampe ........................ 60/787 |
| 5,184,458 A | * | 2/1993 | Lampe et al. ................. 60/787 |
| 5,201,798 A | | 4/1993 | Hogan |
| 5,209,056 A | * | 5/1993 | Shekleton et al. ............ 60/778 |
| 5,343,778 A | | 9/1994 | Romero et al. |
| 5,408,821 A | | 4/1995 | Romero et al. |
| 5,822,838 A | * | 10/1998 | Seal et al. ................. 29/469.5 |
| 6,105,370 A | * | 8/2000 | Weber ........................ 60/733 |

* cited by examiner

*Primary Examiner*—Justine R. Yu
*Assistant Examiner*—William H. Rodriguez
(74) *Attorney, Agent, or Firm*—Robert Desmond, Esq.

(57) ABSTRACT

A system for starting an APU, including an air control valve assembly located in the air flow passageway extending between a source of pressurized air and a turbine power modulator. The system further includes a fuel control valve assembly located in the fuel flow passageway extending between a source of jet fuel and the turbine power modulator. Upon energizing the air control and fuel control valves, a mixture of compressed air and jet fuel entering the turbine power module is ignited, creating a flow steam of hot gases for driving a gas turbine to power the APU.

24 Claims, 2 Drawing Sheets

JET FUEL AND AIR SYSTEM FOR STARTING AUXILIARY POWER UNIT

BACKGROUND OF THE INVENTION

The present invention generally relates to an Auxiliary Power Unit (APU) of the type capable of providing power to an aircraft as needed. In particular, the present invention is directed to lightweight and high-energy start system for providing power to the APU to initiate APU start up.

Conventional APU start-up systems (electric, hydraulic and pressurized air start systems (PASS) are not utilized to provide in-flight emergency power because of the significant size and weight requirements. In one system developed for the F-22, a jet fuel/air-stored energy system was utilized for both APU starting and in-flight emergency power. This system when used for APU starting and emergency power has increased complexity, weight and cost relative to a system designed for an APU start-only system. It is considered desirable to minimize the weight, complexity and cost if at all possible.

In a known APU start-up system, the turbine power module (TPM) combustor utilized for driving an APU gearbox was designed to operate in both fuel-rich and lean-burn modes. The fuel-rich mode reduced air consumption during extended emergency power operation, while the lean-burning mode eliminated the normal maintenance required by carbon accumulations during APU ground starts.

A rich-burn mode requires the use of high-temperature combustor liner to maintain fuel-rich combustion at low power levels. Such a liner would not be needed for a high-powered, lean-burning APU starting system. By removing the combustor liner, liner insulation and transition liner, it would not only reduce cost and weight but, more importantly, it may significantly reduce the TPM's sensitivity to temperature transients. The relatively large thermal mass of the combustor housing may be better able to handle any high-temperature combustion transients.

Because the "touch" temperature should not exceed 500° F. for safety considerations after single ground starts, the need for an outside insulation blanket would be eliminated. A further disadvantage of conventional start-up systems resides the complexity of the combustor head. Fuel-rich combustor processing requires the use of a duplex fuel nozzle to provide a wide turndown ratio. However, since the APU starter system only operates at one power level and does not require large droplets to maintain clean fuel-rich combustion at high power levels, the duplex nozzle configuration and associated divider valve utilized in an APU start system providing emergency power can be eliminated, resulting in significant cost and weight savings.

There is a clear need for an improved APU starter system capable of meeting the streamlined requirements of ground starting while operating in single, lean-burning mode. Such a starter-system should be of minimum size and weight and be able to function with a limited amount of compressed air and fuel.

SUMMARY OF THE INVENTION

In one aspect of the present invention, an APU starter system is disclosed. The system includes a source of pressurized air and a source of jet fuel. The system further includes a turbine power module attached to an APU. An air flow passageway joins the source of pressurized air to the turbine power module. A fuel flow passageway joins the source of jet fuel to the turbine power module, and a separate valve assembly located in each flow passageway controls the flow of compressed air and jet fuel into the turbine power module.

In another aspect of the invention, an APU starter system includes a source of pressurized air, comprising at least one storage vessel. The system further includes a source of jet fuel, comprising a fuel tank. A turbine power module is attached to an APU and an air flow passageway joins the at least one storage vessel to the turbine power module. A fuel flow passageway joins the fuel tank to the turbine power module. A separate valve assembly located in each flow passageway controls the flow of compressed air and jet fuel into the turbine power module.

In a yet further aspect of the invention, an APU starter system formed in accordance with the present invention includes a source of pressurized air, comprising at least one storage vessel and a source of jet fuel comprising a fuel tank. The system further includes a turbine power module attached to an APU with an air flow passageway joining the at least one storage vessel to the turbine power module and a fuel flow passageway joining the fuel tank to the turbine power module. A modulating valve assembly located in the air flow passageway and a control valve located in the fuel flow passageway control the flow of compressed air and jet fuel into the turbine power module.

In another aspect of the present invention, a method of starting an APU includes the step of energizing a control valve located in an air flow system between a source of pressurized air and a turbine power module. The method further includes the step of energizing a control valve located in a fuel flow system between a source of jet fuel and the turbine power module. The method also includes the step of igniting the mixture of air and fuel within the turbine power module to create a steam of hot gases; and directing the steam of hot gases onto turbine blades for rotating the blades to drive the APU through a gearbox.

These and other features, aspects and advantages of the present invention will become better understood with reference to the following drawings, description and claims.

DETAILED DESCRIPTION OF THE INVENTION

The following detailed description is of the best currently contemplated modes of carrying out the present invention. The description is not to be taken in a limiting sense, but is made merely for the purpose of illustrating the general principles of the invention, since the scope of the invention is best defined by the appended claims.

The present invention provides an APU starter system configured solely for the APU starting function, resulting in significant cost and weight savings. The system includes an assembly for providing a quantity of pressurized air and fuel to a Turbine Power Module (TPM) allowing it to power an APU without being driven by the APU.

Figure 1:
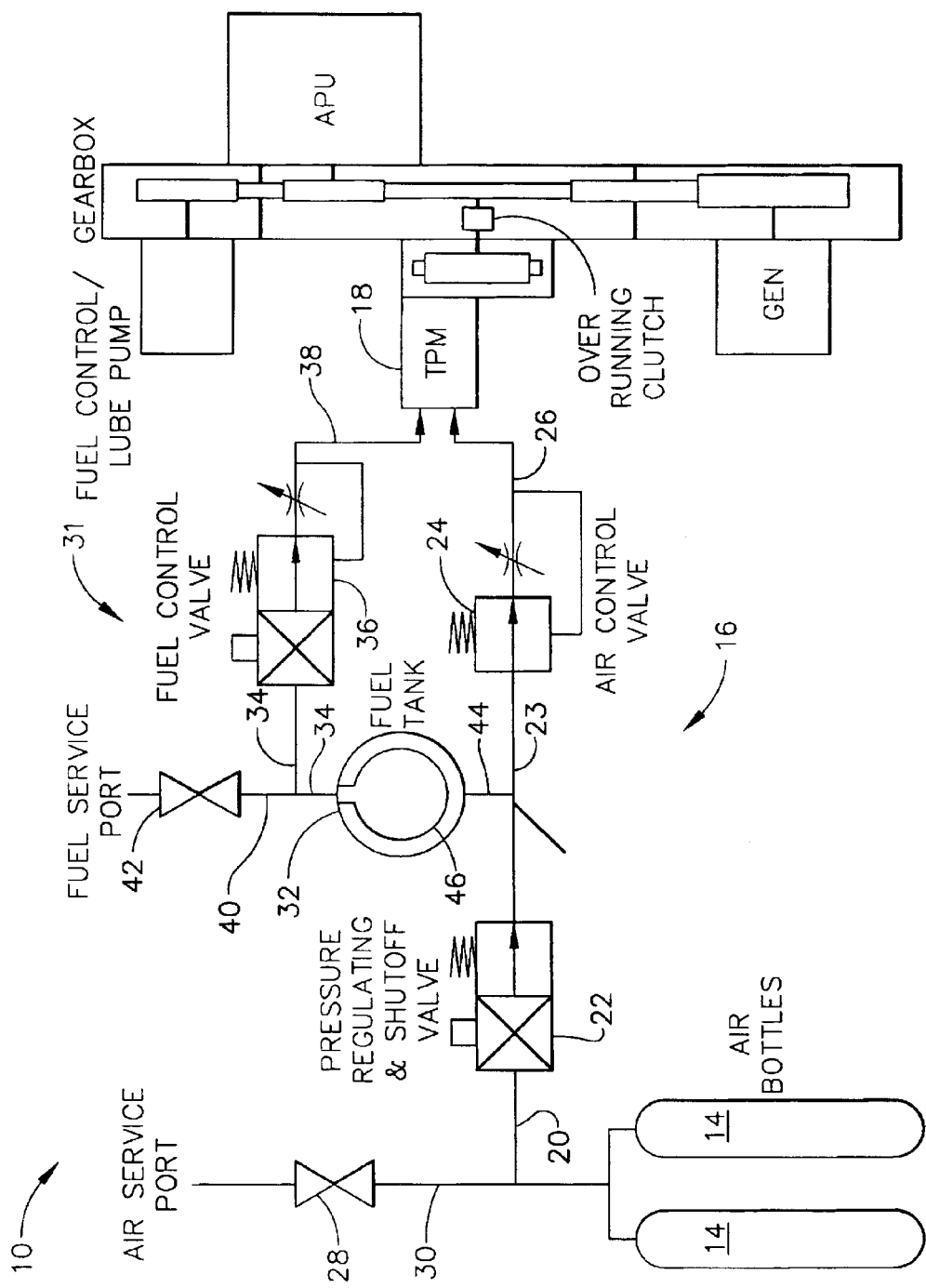
FIG. 1 shows a schematic system of an APU starter system formed in accordance with the present invention.

Referring to FIG. 1, an APU starter system 10 includes a high-pressure air supply system which may include one or more high-pressure storage vessels 14. Storage vessels 14 may be formed of an aluminum-lined composite wound material, filled with compressed air. The number of vessels 14 utilized is dependent on the desired quantity of compressed needed and the space requirements of the starter system.

A high pressure air supply system 16 connects storage vessels 14 with the turbine power module 18. In particular, compressed air storage vessels 14 are pneumatically connected by passageway 20 with an input of pressure regulator and shut-off valve 22. Air passageway 23 connects the output of valve 22 with an input of air control valve 24. An output of control valve 24 is connected by passageway 26 to the input of the turbine power module 18. A service port 28 is connected by passageway 30 with compressed air storage vessels 14 for rapidly recharging vessels 14 from an external high-pressure air source or aircraft air compressor, not shown, following an APU start. Components of the high-pressure air supply system 16 may be integrated into other aircraft systems. Likely system components may include the high-pressure air vessels 14, pressure regulator 22 and the air recharge compressor.

The fuel supply system 31 of the APU starter system delivers jet fuel to the turbine power module 18. Jet fuel may be supplied by a dedicated fuel tank 32 having an output connected by fuel passageway 34 to the input of a modulating fuel control valve 36. The output of modulating fuel control valve 36 can be connected to turbine power module 18 by fuel passageway 38. Fuel tank 32 may be refilled from an external supply, not shown, by fuel passageway 40, with fuel service port 42 controlling the flow through passageway 40.

In order to expel fuel from tank 32 at the required pressure, a fuel tank expulsion system may be pneumatically pressurized, possibly by utilizing air from the air supply system 16 via air passageway 44. A free-surface, piston, diaphragm, or bladder-type expulsion device 46, may be used to rapidly expel the fuel from tank 32 into fuel passageway 34.

Air control valve 24 can regulate the flow of air into the turbine power module 18. The pressure regulator and shut off valve 22 can provide positive shutoff to the flow of pressurized air from vessels 14, while maintaining a regulated inlet pressure to air control valve 24 as the air pressure decays during blow down of the vessels 14 during an APU start.

The modulating fuel control valve 36 may regulate the flow of jet fuel into the turbine power module 18. Fuel control system 30 may incorporate a shut-off valve, depending on the form of fuel pressurization incorporated into the system. If the fuel is not under pressure when the starter system 10 is inactive, then a simple check valve may suffice as an alternative to such a shutoff valve. Fuel control valve 36 may take the form of fixed fuel orifice or a modulating valve, depending on the air flow rates expected and system requirements. A modulating fuel control valve 36 may be utilized to facilitate adjustments in fuel flow to optimize pre-ignition and post-ignition fuel flow rates.

Figure 2:
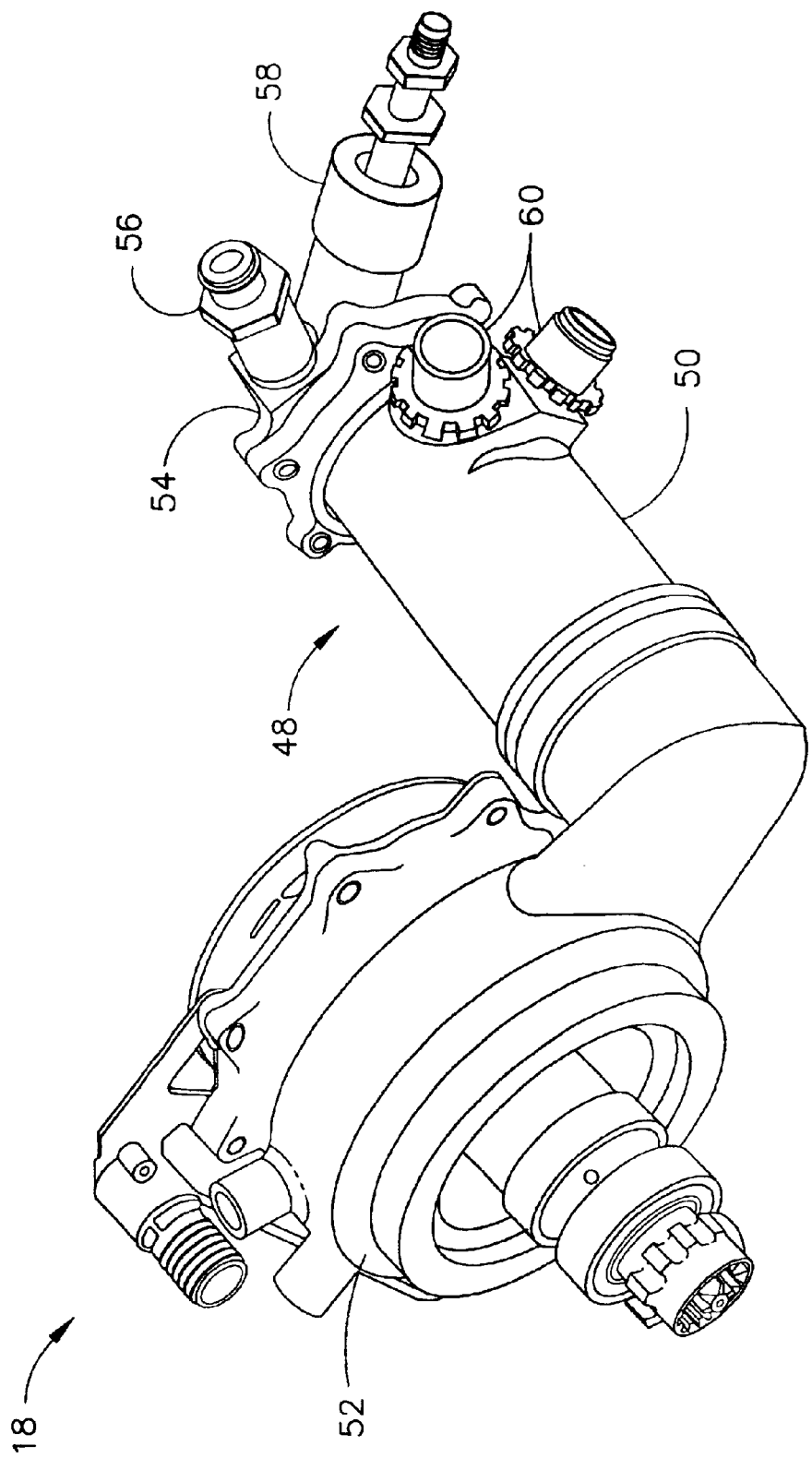
FIG. 2 shows a perspective view of a turbine power module formed in accordance with the present invention.

As shown in FIG. 2, the turbine power module 18 may include a combustor 48 that converts the compressed air and the jet fuel into hot gas. The combustor 48 may comprise a hollow cylinder 50 welded to one end of the turbine housing 52 and capped with a flange-mounted combustor head 54 located at the other end of the turbine housing 52. The combustor head 54 may include a fuel nozzle 56 and air injectors 58 which mix the steam of pressurized air the jet fuel as it enters the combustor cylinder 50. Igniters 60 mounted on the walls of the cylinder 50 can ignite the mixture when excited by an ignition unit. The combustor 48 may also include an insulated thermal liner inside the combustor 48 and a transition liner when the gas turns the corner to enter the turbine nozzles. During operation, the turbine power module 18 may direct the hot gases from the combustor 48 onto the turbine blades rotating assembly, not shown. This, in turn, can cause the rotating turbine assembly to accelerate and drive the APU through the over-running clutch in the APU gearbox.

It is within the scope of the present invention to replace the air control valve 24 with an orifice, sonic orifice or venturi valve. This is possible because variations in air density with ambient temperature are not sufficient to significantly affect either ignition reliability or APU start time.

It is also within the scope of the present invention to replace the fuel control valve 36 with an orifice, sonic orifice or venturi valve because the flow range required for the APU starter is much narrower.

The simplified APU starter system of the present invention eliminates the necessity for the pressure transducers and temperature sensors which may be required in an APU start system providing emergency power. The single speed APU gearbox may be greatly simplified compared to the two speed gearboxes required by conventional starter systems. By achieving the maximum torque assist from the APU during starting, the run time of the turbine power module and the stored energy usage are reduced. Maximum output of the APU may be achieved by operating at the maximum turbine inlet temperature, which may exceed 2200° F., and minimum surge bleed flow during the APU start. By employing a modulating surge control or two position surge valve as opposed to the current on-off surge control valve the APU may accelerate faster by reducing the amount of surge bleed during APU starting. This provides a tradeoff between reduced stored energy and the added weight and cost of utilizing a more complex APU surge valve.

It should be understood, of course, that the foregoing relates to preferred embodiments of the invention and that modifications may be made without departing from the spirit and scope of the invention as set forth in the following claims.

We claim:

1. An auxiliary power unit (APU) starter system comprising:
   a source of pressurized air that comprises one or more high-pressure storage vessels each having an aluminum-lined composite configuration, filled with compressed air;
   a source of jet fuel;
   a turbine power module attached to an APU;
   an air flow passageway joining the source of pressurized air to the turbine power module;
   a fuel flow passageway joining the source of jet fuel to the turbine power module;
   a second air flow passageway laming the source of pressurized air to a fuel expulsion device for expelling fuel from the source of jet fuel through the fuel flow passageway; and
   a separate valve assembly located in each flow passageway for controlling the flow of compressed air and jet fuel into the turbine power module.

2. The APU starter according to claim 1, wherein the valve assembly located in the air flow passageway comprises a modulating air control valve and a separate regulator and shutoff valve located between the air control valve and the source of pressurized air.

3. The APU starter according to claim 1, wherein the valve assembly located in the air flow passageway comprises a fixed orifice valve and a shutoff valve located between the fixed orifice and the source of pressurized air.

4. The APU starter according to claim 1, wherein the valve assembly located in the fuel flow passageway comprises a modulating fuel control valve.

5. The APU starter according to claim 1, wherein the valve assembly located in the fuel flow passageway comprises a fixed valve orifice.

6. An auxiliary power unit (APU) starter system comprising:
   a source of pressurized air;
   a source of jet fuel that comprises a fuel tank including an expulsion device for expelling the fuel from the tank;
   a turbine power module attached to an APU;
   an air flow passageway joining the source of pressurized air to the turbine power module;
   a fuel flow passageway joining the fuel tank to the turbine power module;
   a second air flow passageway joining the source of pressurized air to the expulsion device; and
   a separate valve assembly located in each flow passageway for controlling the flow of compressed air and jet fuel into the turbine power module.

7. An auxiliary power unit (APU) starter system, comprising:
   a source of pressurized air that comprises one or more high-pressure storage vessels each having an aluminum-lined composite configuration, filled with compressed air;
   a source of let fuel comprising a fuel tank;
   a turbine power module attached to an APU;
   an air flow passageway joining at least one storage vessel to the turbine power module;
   a fuel flow passageway joining the fuel tank to the turbine power module;
   a second air flow passageway joining the source of pressurized air to a fuel expulsion device for excelling fuel from the fuel tank through the fuel flow passageway; and
   a separate valve assembly located in each flow passageway for controlling the flow of compressed air and jet fuel into the turbine power module.

8. The APU starter according to claim 7, wherein the expulsion device comprises at least one component selected from a group essentially comprising a bladder-type expulsion device, a piston, a diaphragm, and a free-surface device.

9. The APU starter according to claim 7, wherein the valve assembly located in the air flow passageway further comprises a modulating air control valve and a separate regulator and shutoff valve located between the air control valve and the source of pressurized air.

10. The APU starter according to claim 7, wherein the valve assembly located in the air flow passageway further comprises a fixed orifice valve and a shutoff valve located between the fixed orifice and the source of pressurized air.

11. The APU starter according to claim 7, wherein the valve assembly located in the fuel flow passageway comprises a modulating fuel control valve.

12. The APU starter according to claim 7, wherein the valve assembly located in the fuel flow passageway comprises a fixed valve orifice.

13. An auxiliary power unit (APU) starter system, comprising:
   a source of pressurized air comprising at least one storage vessel;
   a source of jet fuel comprising a fuel tank;
   a turbine power module attached to an APU;
   an air flow passageway joining the at least one storage vessel to the turbine power module;
   a fuel flow passageway joining the fuel tank to the turbine power module;
   a second air flow passageway joining the source of pressurized air to a fuel expulsion device for expelling fuel from the fuel tank through the fuel flow passageway; and
   a modulating valve assembly located in the air flow passageway and a control valve located in the fuel flow passageway for controlling the flow of compressed air and jet fuel into the turbine power module,
   wherein the APU starter system excludes a pressure transducer and a temperature sensor.

14. The APU starter according to claim 13, wherein the modulating valve assembly located in the air flow passageway comprises a modulated air control valve and a separate shutoff valve located between the modulated air control valve and the source of pressurized air.

15. The APU starter according to claim 13, wherein the control valve comprises a fixed orifice valve located between the fuel tank and the turbine power module.

16. A method of starting an auxiliary power unit (APU), comprising the steps of:
   energizing a control valve located in an air flow system between a source of pressurized air and a turbine power module;
   energizing a control valve located in a fuel flow system between a source of let fuel and the turbine power module;
   expelling fuel from the source of jet fuel pressurizing a fuel expulsion device with an air flow from the source of pressurized air;
   igniting a mixture of air and fuel within the turbine power module to create a stream of hot gases; and
   directing the stream of hot gases onto turbine blades for rotating the blades to drive the APU through a gearbox,
   wherein the APU excludes a pressure transducer and a temperature sensor.

17. An auxiliary power unit (APU) starter system, comprising:
   a source of pressurized air;
   a fuel tank including an expulsion device for expelling the fuel from the tank;
   a turbine power module attached to an APU;
   an air flow passageway joining the at least one storage vessel to the turbine power module;
   a fuel flow passageway joining the fuel tank to the turbine power module:
   a second air flow passageway joining the source of pressurized air to the fuel expulsion device for expelling fuel from the fuel tank through the fuel flow passageway; and
   a separate valve assembly Located in each flow passageway for controlling the flow of compressed air and jet fuel into the turbine power module.

18. The APU starter system according to claim 17, wherein the source of compressed air further comprises at least one high-pressure storage vessel.

19. The APU starter system according to claim 18, wherein the at least one storage vessel further comprises a pair of high-pressure storage vessels each having an aluminum-lined composite configuration, filled with compressed air.

20. The APU starter system according to claim 17, wherein the expulsion device further comprises at least one component selected from a group essentially comprising a bladder-type expulsion device, a piston, a diaphragm, and a free-surface device.

21. The APU starter system according to claim 17, wherein the valve assembly located in the air flow passageway comprises a modulating air control valve and a separate regulator and shutoff valve located between the air control valve and the source of pressurized air.

22. The APU starter system according to claim 17, wherein the valve assembly located in the air flow passageway comprises a fixed orifice valve and a shutoff valve located between the fixed orifice and the source of pressurized air.

23. The APU starter system according to claim 17, wherein the valve assembly located in the fuel flow passageway comprises a modulating fuel control valve.

24. The APU starter system according to claim 17, wherein the valve assembly located in the fuel flow passageway comprises a fixed orifice valve.

* * * * *